(12) United States Patent
Yamashita

(10) Patent No.: US 6,751,186 B2
(45) Date of Patent: Jun. 15, 2004

(54) OPTICAL DISK CARTRIDGE

(75) Inventor: Tatsumaro Yamashita, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/478,582

(22) Filed: Jan. 6, 2000

(65) Prior Publication Data

US 2003/0128652 A1 Jul. 10, 2003

(30) Foreign Application Priority Data

Jan. 8, 1999 (JP) ............................................. 11-002687

(51) Int. Cl.⁷ ................................................. G11B 7/26
(52) U.S. Cl. ....................................................... 369/291
(58) Field of Search ............................... 369/291, 290; 360/133, 132

(56) References Cited

U.S. PATENT DOCUMENTS

| | | | |
|---|---|---|---|
| 5,166,922 A | * 11/1992 | Akiyama et al. | ............. 360/133 |
| 5,175,726 A | * 12/1992 | Imokawa | ..................... 360/133 |
| 5,903,541 A | 5/1999 | Mizutani et al. | ............. 369/291 |
| 6,057,995 A | * 5/2000 | Yamashita et al. | ........... 360/133 |

FOREIGN PATENT DOCUMENTS

| | | |
|---|---|---|
| EP | 0 358 269 A1 | 3/1990 |
| EP | 0 368 347 A2 | 5/1990 |
| EP | 0 421 775 A2 | 10/1991 |
| EP | 0 657 882 A2 | 6/1995 |
| EP | 0 669 615 A3 | 8/1995 |

* cited by examiner

*Primary Examiner*—Carl Whitehead, Jr.
*Assistant Examiner*—Jennifer M. Dolan
(74) *Attorney, Agent, or Firm*—Brinks Hofer Gilson & Lione

(57) ABSTRACT

An optical disk cartridge includes a casing having a pair of walls for accommodating an optical disk therein. In the optical disk cartridge, the walls of the casing are formed with clamping windows for clamping the disk at the central portions thereof, and are formed with reading and writing windows for reading information from the disk and writing information on the disk from the clamping windows to side edges of the casing. A shutter capable of opening and closing the clamping windows and the reading and writing windows is slidably provided. The horizontal size of the clamping windows along a sliding direction of the shutter is formed shorter than the vertical size thereof orthogonal to the sliding direction of the shutter.

4 Claims, 15 Drawing Sheets

OPTICAL DISK CARTRIDGE

BACKGROUND OF THE INVENTION

1. Field of the Invention

The present invention relates to an optical disk cartridge for DVD-RAMs (digital versatile disk RAMs), and more particularly, relates to an optical disk cartridge suitable for use with 80 mm disks.

2. Description of the Related Art

Some optical disks, such as some CDs and DVDS, used while being accommodated in an optical disk cartridge.

A conventional disk cartridge for accommodating therein large (120 mm) disks will be described with reference to FIGS. 30 and 31.

Top and bottom faces of a casing 21 are formed with clamping windows 21a opposing the center of the casing 21, and are formed with reading and writing windows 21b connected to the clamping windows 21a.

Each of the clamping windows 21a consists of a semicircular portion (R1 is about 17 mm) and a portion connected from the circular portion to each of the reading and writing windows 21a.

When an optical disk cartridge is loaded on a disk driving apparatus 22, as shown in FIG. 31, a shutter is moved to open the clamping windows 21a and the reading and writing windows 21b.

When the disk D is loaded, a table 23 enters into the clamping window 21a formed in the bottom face of the casing 21, and a clamper (not shown) enters into the clamping window 21a formed in the top face of the casing 21, whereby the disk D in the casing 21 is clamped while being slightly raised.

An optical head 24 is moved along the reading and writing windows 21b, whereby information is read from the disk D and is written on the disk D.

In order to smoothly insert the table 23 and the clamper into the clamping windows 21a, it is necessary to form opening areas of the clamping windows 21a larger than the table 23 or the clamper with clearance therebetween.

In particular, in an optical disk cartridge in which the table 23 is rotated about a fulcrum 25 to enter the clamping windows 21a, as shown in FIG. 31, a terminal edge 26 of the table 23 easily interferes with the peripheries of the clamping windows 21a, and it is necessary to form the clamping windows 21a larger than the table 23 with sufficient clearance.

According to an optical disk cartridge for accommodating therein small (80 mm) disks, it is difficult to form large (equivalent to 120 mm) clamping windows 21a. If the clamping windows 21a are enlarged, the width of the shutter for closing the clamping windows 21a is correspondingly increased, and side edges of the shutter may be extruded from the casing 1 when the shutter is slid to an opening position.

SUMMARY OF THE INVENTION

Accordingly, it is an object of the present invention to provide an optical disk cartridge which can form a large clamping window while preventing a shutter at an opening position from being extruded from a casing.

In accordance with the present invention, there is provided an optical disk cartridge including a casing having a pair of walls for accommodating an optical disk therein; wherein the walls of the casing are formed with clamping windows for clamping the disk at the central portions thereof, and are formed with reading and writing windows for reading information from the disk and writing information on the disk from the clamping windows to side edges of the casing; a shutter capable of opening and closing the clamping windows and the reading and writing windows is slidably provided, and the horizontal size of the clamping windows along a sliding direction of the shutter is formed shorter than the vertical size thereof orthogonal to the sliding direction of the shutter.

In the optical disk cartridge of the present invention, the clamping windows may be formed by linear parts opposing along the sliding direction of the shutter, and arcuate parts connecting the linear parts, and a distance between the linear parts may be shorter than a diameter of the arcuate parts.

In addition, the diameter of the arcuate parts of the clamping windows may be ±2 mm of 28 mm, and the distance between the linear parts may be ±2 mm of 27.4 mm.

In the optical disk cartridge of the present invention, projections for narrowing the width of the reading and writing windows may be formed on the border of the clamping windows and the reading and clamping windows.

DESCRIPTION OF THE PREFERRED EMBODIMENT

Figure 1:
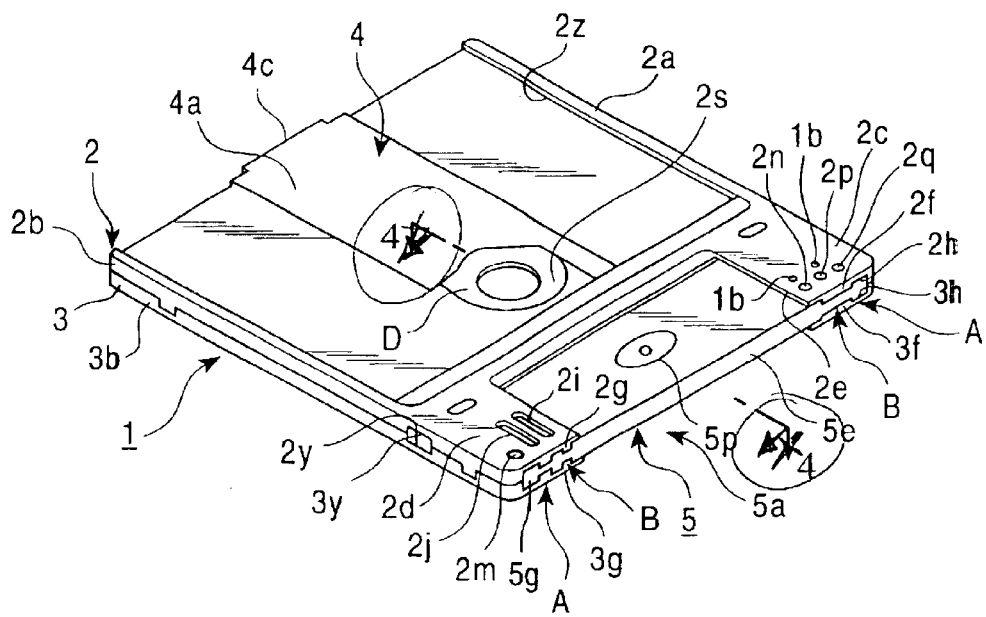
FIG. 1 is a perspective view of an optical disk cartridge according to the present invention.

While optical disk cartridges exist for DVD-RAM disks of 120 mm in diameter, optical disk cartridges for DVD-RAM disks of 80 mm in diameter have not previously been developed.

The present invention provides an optical disk cartridge for 80 mm disks which can also be applied to optical disk cartridges for 120 mm disks, and to a disk driving apparatus for the optical disk cartridge for 120 mm disks.

An embodiment of an optical disk cartridge of the present invention applied to the 80-mm disks used for a DVD-RAM will now be described with reference to FIGS. 1 to 29.

A casing 1 consists of top and bottom covers 2 and 3 which are molded articles made of synthetic resin.

Since the top and bottom covers 2 and 3 have nearly the same construction, only the bottom cover 3 will be described in detail. Regarding the top cover 2, portions thereof which differ from those of the bottom cover 3 will also be described.

As shown in FIGS. 1 to 15, the bottom cover 3 includes a planar wall 3a, a pair of side walls 3b provided on the left and right of the wall 3a, and a rectangular cutout 3e which is formed in front of the wall 3a with spaces 3c and 3d remaining between the side walls 3b.

In addition, the bottom cover 3 includes front walls 3f and 3g provided at left and right front positions corresponding to the spaces 3c and 3d. The front walls 3f and 3g are provided with recesses 3h of different shapes at positions exposed to the outside so as to form incorrect-insertion-preventing sections A.

As shown in FIGS. 11 to 15, the space 3c of the wall 3a is provided with operating slots 3i and 3j, and a breakable blocking part 3m consisting of a projection and having thin-walled parts 3k at the base portion thereof which are sequentially arranged side by side.

The space 3d of the wall 3a is provided with a circular discrimination hole 3n for discriminating whether or not information can be written on the disk, a circular discrimination hole 3p for discriminating whether or not the checking for defective regions has been completed, and a circular blocking part-removing hole 3q, all of which are sequentially arranged side by side. The discrimination hole 3n and the operating slot 3i, the discrimination hole 3p and the operating slot 3j, and the hole 3q and the blocking part 3m are provided at positions equidistant from the center of the wall 3a.

The bottom cover 3 includes a spring receiver 3r formed on the rear thereof, a substantially circular clamping window 3s formed in the center thereof, a rectangular reading and writing window 3t provided continuously with the clamping window 3s. Projections 3u are formed on the border of the clamping window 3s and the reading and writing windows 3t so as to narrow the width of the window 3t. An arcuate rim 3v is provided on the rear of the inside of the bottom cover 3. Regulating parts 3w are connected to both ends of the rim 3v and extending rearward inclined relative to the side walls 3b. A base 3x is provided over the central portion of the inside of the bottom cover 3, a pair of latching recesses 3y are provided at opposing positions of the side walls 3b, and a rectangular recessed part 3z is provided on the back of the wall 3a of the bottom cover 3.

Figure 11:
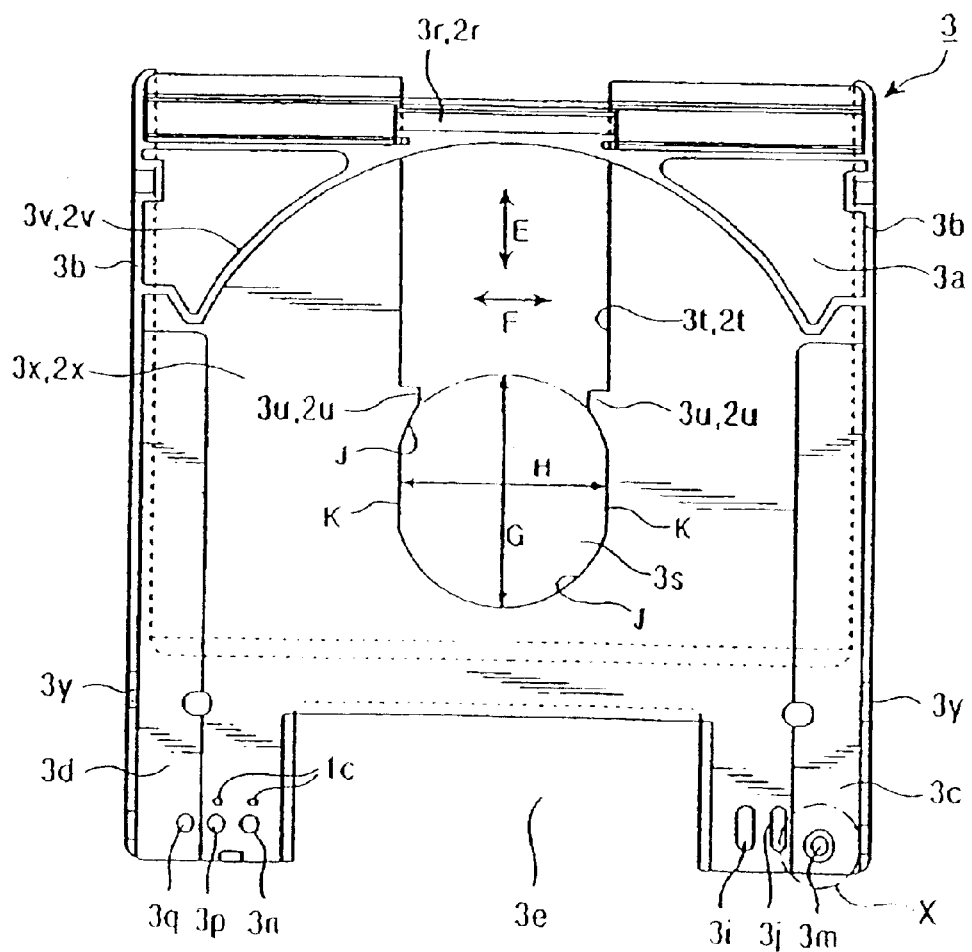
FIG. 11 is a plan view of a bottom cover in the optical disk cartridge according to the present invention.
Figure 12:
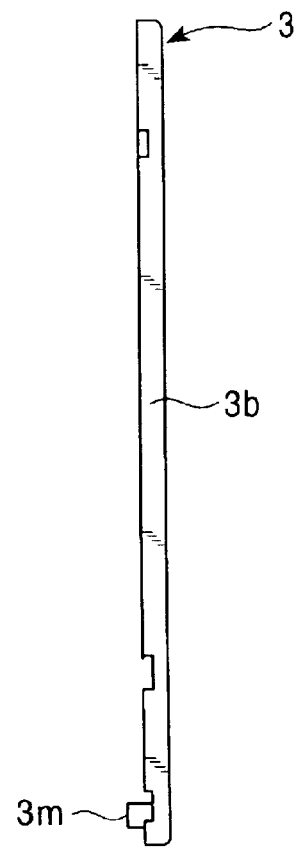
FIG. 12 is a side view of the bottom cover.
Figure 13:
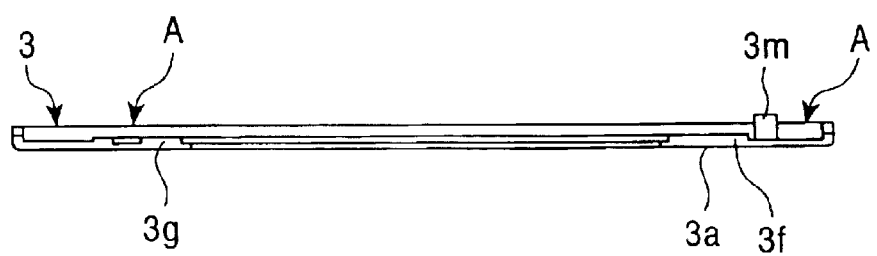
FIG. 13 is a front view of the bottom cover.
Figure 14:
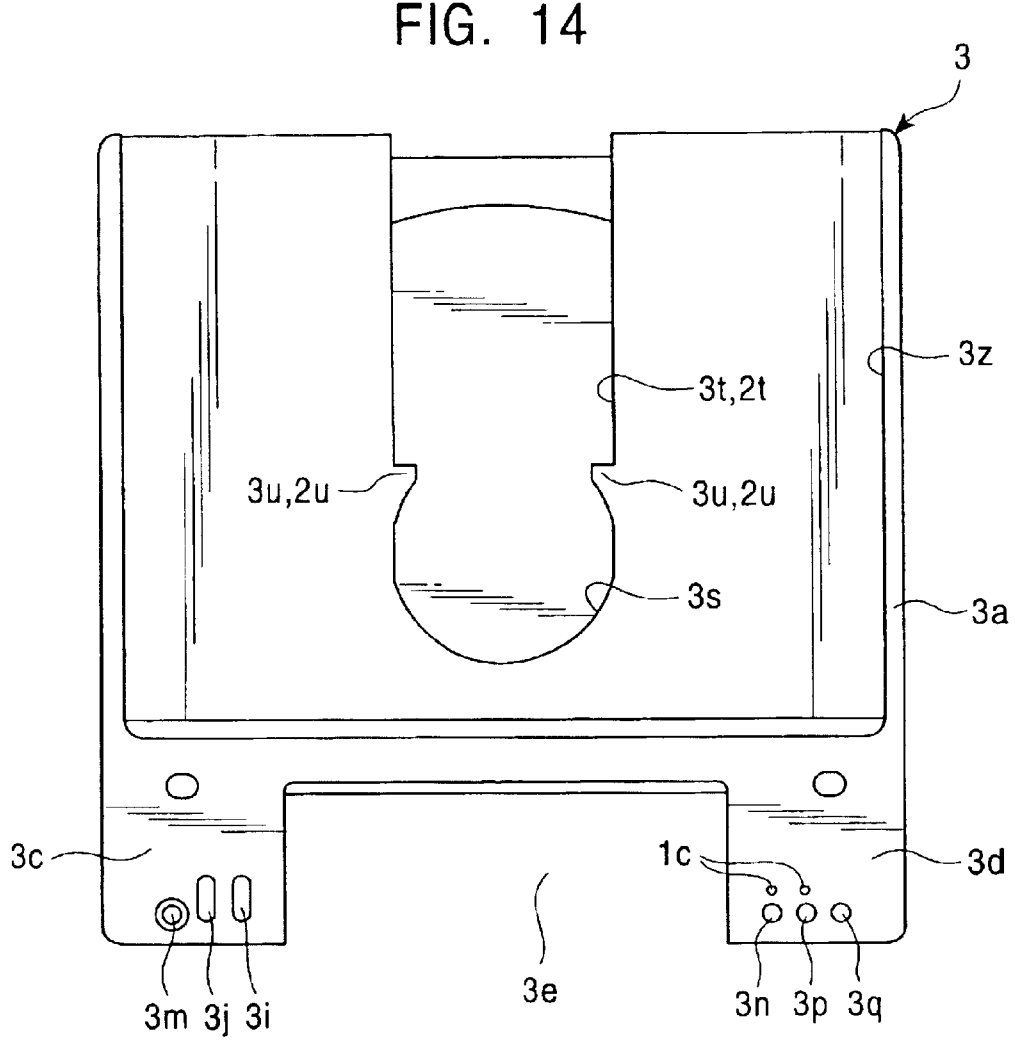
FIG. 14 is a rear elevation view of the bottom cover.
Figure 15:
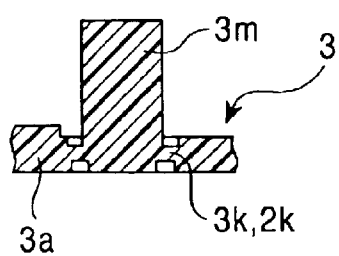
FIG. 15 is an enlarged sectional view of a portion identified by X in FIG. 11.

Referring to FIG. 11, in the window 3t for reading and writing, an optical head (not shown) linearly moves so as to read and write information from and onto the disk D. When the direction of movement of the optical head is taken as a vertical direction E, and the direction orthogonal to the vertical direction E is taken as a horizontal direction F, the clamping window 3s is formed by arcuate parts J each having a radius of 14 mm from the center C of the window 3s (the same as the center C of the disk D. In other words, clamping window 3s has diameter G of 28 mm in the vertical direction E, and linear parts K having a distance therebetween of 27.4 mm parallel to the direction of movement of the optical head, (i.e., the vertical direction E). The arcuate parts J connect the linear parts K.

That is, the clamping window 3s has the horizontal size H along a sliding direction of a shutter which is formed shorter than the vertical size G orthogonal to the sliding direction of the shutter, and has a diameter G (28 mm) in the vertical direction E which is formed larger than the distance H (27.4 mm) in the horizontal direction F.

The same construction applies to a clamping window 2s of the top cover 2, and the diameter G may preferably be ±2 mm of 28 mm, and the width H may preferably be ±2 mm due to the relationship between the entire width of the casing 1 for the 80 mm disk and a motor and shutter (described hereinbelow) of the disk driving apparatus for the 120 mm disk.

The details of the top cover 2 are omitted, and only some of the components and the reference numerals thereof are shown in the figures.

Figure 2:
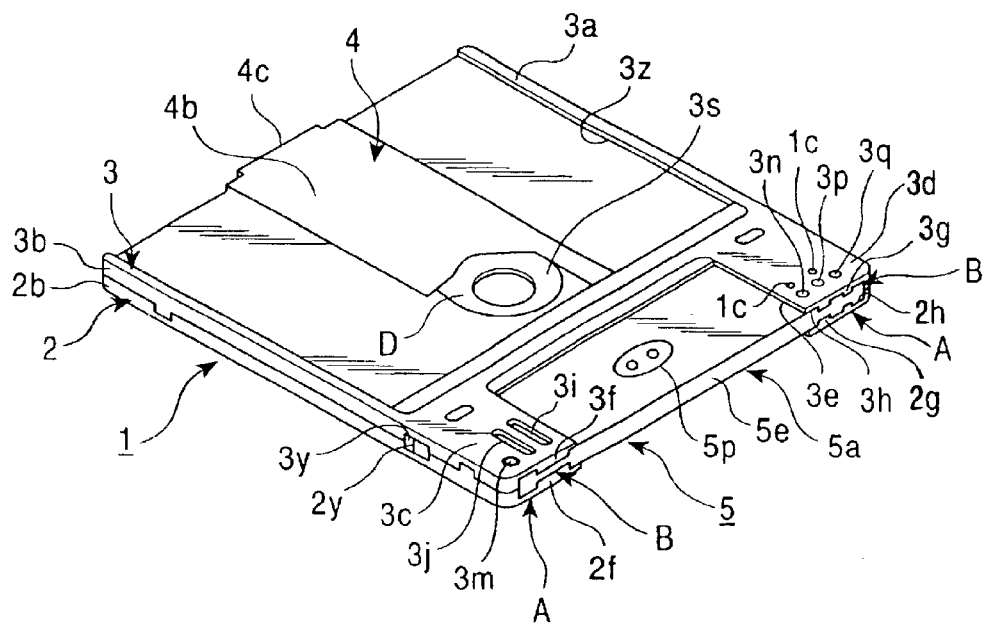
FIG. 2 is a perspective view of the optical disk cartridge shown in FIG. 1 that has been turned upside down.

As will be understood from a comparison of FIG. 1 and FIG. 2, the top cover 2 differs from the bottom cover 3 in that a recessed part 2z is formed on the surface of the wall 2a of the top cover 2, in that a space 2f of the wall 2a is provided with a discrimination hole 2n for discriminating whether or not the information can be written on the disk D, a discrimination hole 2p for determining whether or not the checking for defective regions has been completed, and a blocking part-removing hole 2q. The top cover 2 also differs in that a space 2g of the wall 2a is provided with operating slots 2i and 2j arranged side by side, and a breakable blocking part 2m consisting of a projection and having thin-walled parts 2k at the base portion thereof.

The top cover 2 and the bottom cover 3 constructed as described above are combined vertically to thereby form the casing 1.

Figure 3:
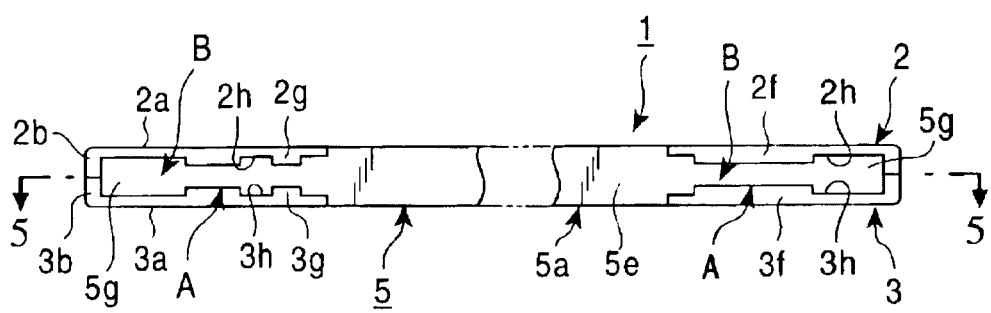
FIG. 3 is a front view of the optical cartridge according to the present invention.
Figure 4:
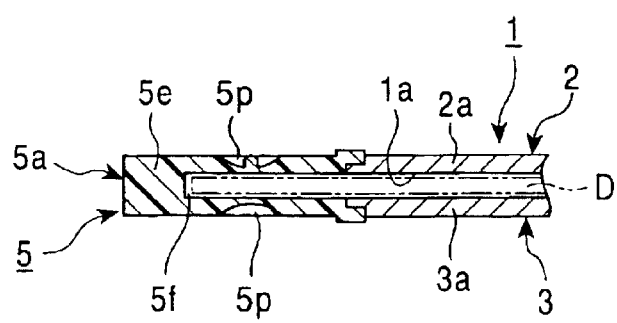
FIG. 4 is a sectional view taken along the line 4—4 in FIG. 1.

When the top and bottom covers 2 and 3 are combined, an accommodating section 1a for accommodating the optical disk D and the like is formed therebetween, and the incorrect-insertion-preventing sections A having recesses of different shapes are formed between the front walls 2f, 2g, 3f and 3g, as shown in FIG. 3.

In addition, when the top and bottom covers 2 and 3 are combined, the discrimination hole 2n of the top cover opposes a part of the operating slot 3i of the bottom cover 3, the discrimination hole 2p opposes a part of the operating slot 3j, the hole 2q opposes the blocking part 3m on the right side of the casing 1, the discrimination hole 3n of the bottom cover 3 opposes a part of the operating slot 2i of the top cover 2, the discrimination hole 3p opposes a part of the operating slot 2j, and the blocking part 2m opposes the hole 3q on the left side of the casing 1.

Closing parts 1b for closing the operating slots 3i and 3j are formed adjacent to the discrimination holes 2n and 2p of the wall 2a opposing the operating slots 3i and 3j, and closing parts 1c for closing the operating slots 2i and 2j are formed adjacent to the discrimination holes 3n and 3p of the wall 3a opposing the operating slots 2i and 2j.

Furthermore, when the top and bottom covers 2 and 3 are combined, a clamping window 2s and a reading and writing window 2t of the top cover 2 opposes the clamping window 3s and the reading and writing window 3t of the bottom cover 3. A rim 2v and regulating parts 2w of the top cover 2 abut against the rim 3v and the regulating parts 3w of the bottom cover 3, a space for holding the disk D is secured between bases 2x and 3x, and latching recesses 2y and 3y are formed in the side walls 2b and 3b.

A shutter 4 is made of a U-shaped metal plate and consists of a rectangular plate part 4a for closing the clamping window 2s and the reading and writing window 2t, a rectangular plate part 4b for closing the clamping window 3s and the reading and writing window 3t, and a connecting part 4c for connecting the plate parts 4a and 4b.

The connecting part 4c is located on the rear of the casing 1. The plate parts 4a and 4b are disposed in the recessed parts 2z and 3z so that the shutter 4 can move within the range of the recessed parts 2z and 3z.

Spring members (not shown) are placed in the spring receivers 2r and 3r, and the shutter 4 is normally located by the spring members at a neutral position to close the clamping windows 2s and 3s and the reading and writing windows 2t and 3t. When the shutter 4 is moved to the right side or the left side against the spring members, the shutter 4 opens the windows 2s, 3s, 2t, and 3t. When the biasing force to the shutter 4 is terminated, the shutter 4 is returned by the spring members to the neutral position again to close the windows 2s, 3s, 2t, and 3t.

As shown in FIGS. 16 to 19, a holder 5, which is a molded article made of synthetic resin includes a base part 5a, a pair of elastic arms 5b provided at both ends of the base part 5a and extending rearward, a pair of triangular projections 5c provided at the terminal ends of the elastic arms 5b, holding parts 5d projecting from the upper and lower surfaces of the elastic arms 5b near the terminal ends of the elastic arms 5b, an exposed part 5e continuously connected to the inner surfaces of the elastic arms 5b to form the base part 5a, and a groove 5f provided behind the exposed part 5e.

The elastic arms 5b have spring properties on the side of the disk D (i.e., biasing inwardly toward each other). The disk D is inserted into the groove 5f between the elastic arms 5b. The holding parts 5d hold a part of the upper and lower surfaces of the disk D, and the elastic arms 5b hold the left and right peripheries of the disk D.

Figure 16:
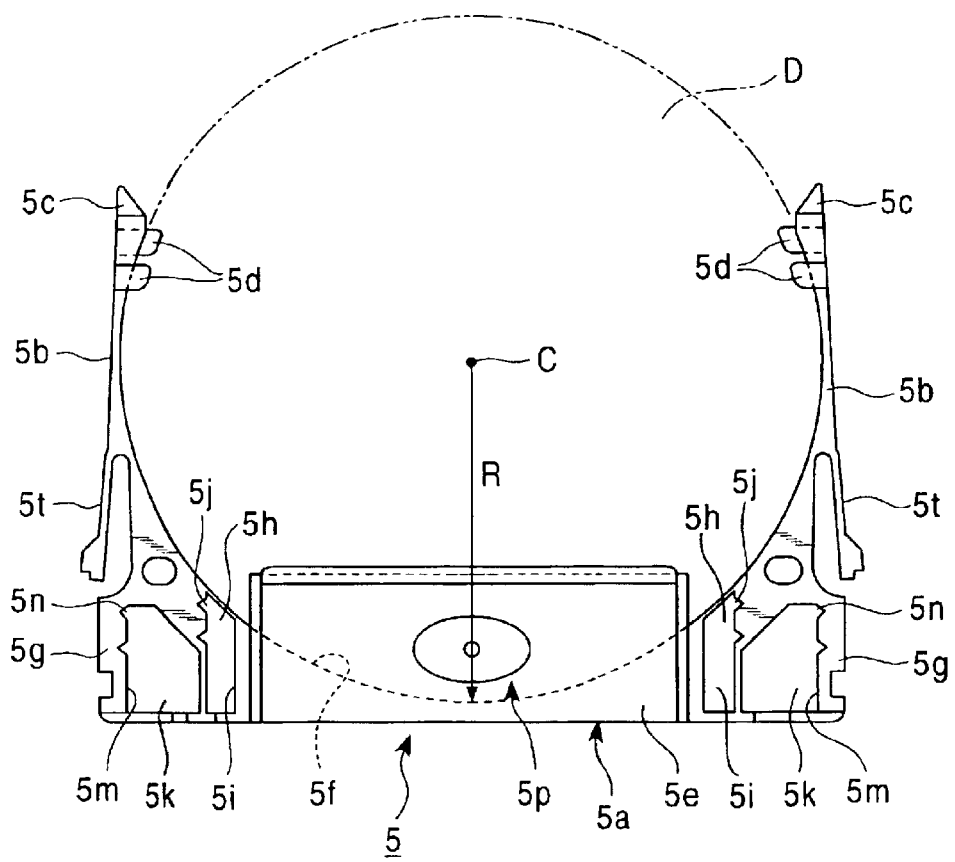
FIG. 16 is a plan view of a holder for the optical disk cartridge.

In addition, as shown in FIG. 16, the elastic arms 5b extend rearward from the base part 5a while exceeding the size of the radius R of the disk D, and the holding parts 5d are formed at positions beyond the radius R of the disk D so as to hold the disk D at positions rearward of the center C of the disk D from the base part 5a.

Figure 5:
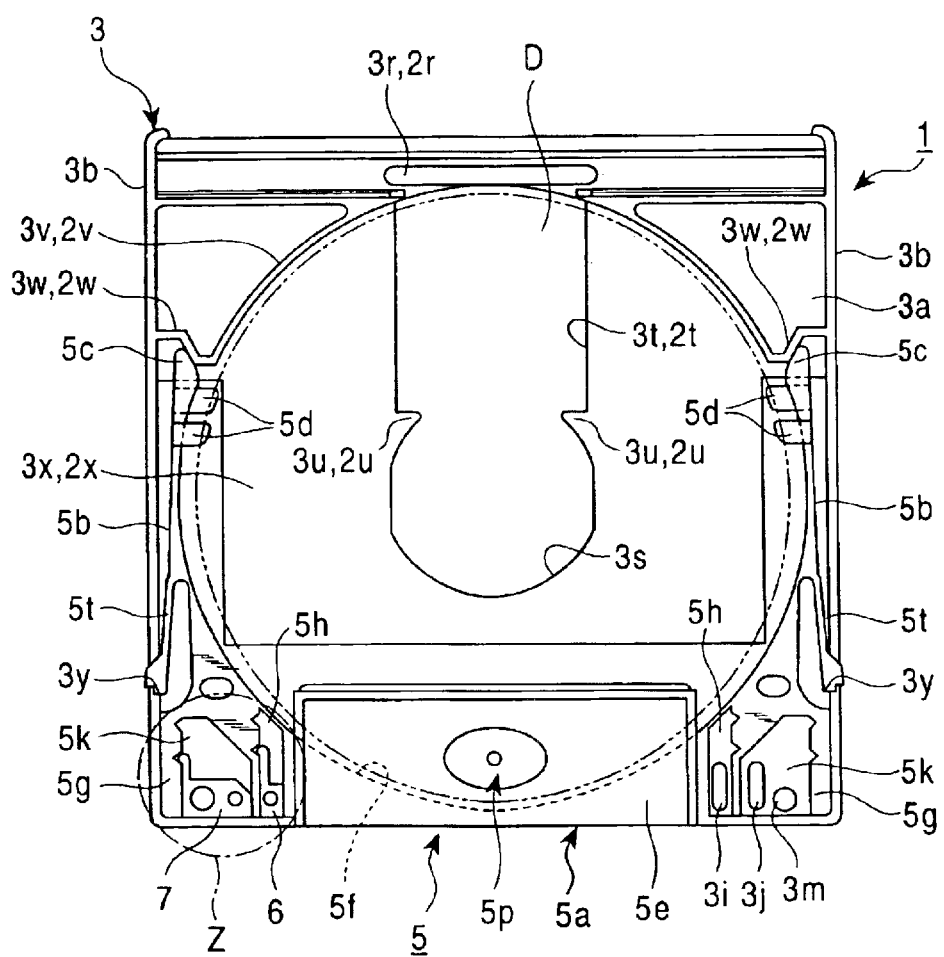
FIG. 5 is a sectional view taken along the line 5—5 in FIG. 3.

The holder 5 can be inserted into and removed from the accommodating section 1a with the disk D held by the elastic arms 5b. When the holder 5 is accommodated in the accommodating section 1a together with the disk D, the projections 5c abut against the regulating parts 2w and 3w, as shown in FIG. 5. When the holder 5 is further pushed in, the elastic arms 5b are spread outwardly to separate from the peripheries of the disk D, whereby the holding of the peripheries of the disk D by the elastic arms 5b is released. The deformation of the elastic arms 5c toward the disk D is prevented by the regulating parts 2w and 3w.

When the holder 5 is mounted in the casing 1, the exposed part 5e is located in the cutouts 2e and 3e so as to be exposed.

In removing the holder 5 from the casing 1, the elastic arms 5b separate from the regulating parts 2w and 3w and return toward the disk D due to the spring properties thereof to hold the disk D, whereby the holder 5 can be removed together with the disk D held thereby.

The holder 5 includes a pair of extended parts 5g located on both sides of the exposed part 5e to form a part of the base part 5a. A pair of first receiving parts 5h, each comprising a substantially rectangular hole are provided in the pair of extended parts 5g at positions equidistant from the widthwise central part of the holder 5. First guide parts 5i, each consisting of side walls forming the receiving parts 5h, and a pair of V-shaped recesses 5j spaced apart in the first guide parts 5i.

The first receiving parts 5h coincide with the discrimination holes 2n and 3n provided in the top and bottom covers 2 and 3, respectively.

The holder 5 also includes a pair of second receiving parts 5k, each comprising a substantially rectangular wide hole, provided in the outside of the first receiving parts 5h at positions equidistant from the widthwise central part of the holder 5, second guide parts 5m each consisting of side walls forming the receiving parts 5k, and a pair of V-shaped recesses 5n spaced apart in the second guide parts 5m.

The second receiving parts 5k coincide with the discrimination holes 2p and 3p provided in the top and bottom covers 2 and 3, respectively, and blocking parts 2m and 3m.

In addition, the holder 5 includes identification marks 5p formed on top and bottom faces of the exposed part 5e. Each of the identification marks 5p consists of an elliptical recess 5q and a projection 5r provided on the recess 5q. As shown in FIGS. 20 to 25, one projection 5r is provided on the top face of the base part 5a, and two projections 5r are provided on the bottom face of the base part 5a so that top and bottom faces of each of the identification marks 5p can be identified tactilly.

Figure 17:
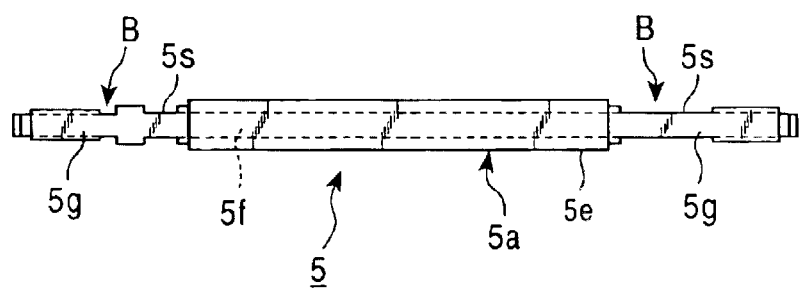
FIG. 17 is a front view of the holder.
Figure 18:
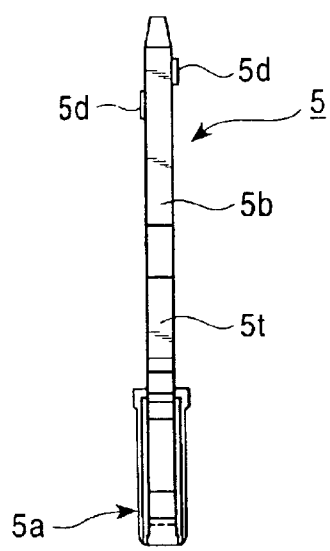
FIG. 18 is a side view of the holder.
Figure 19:
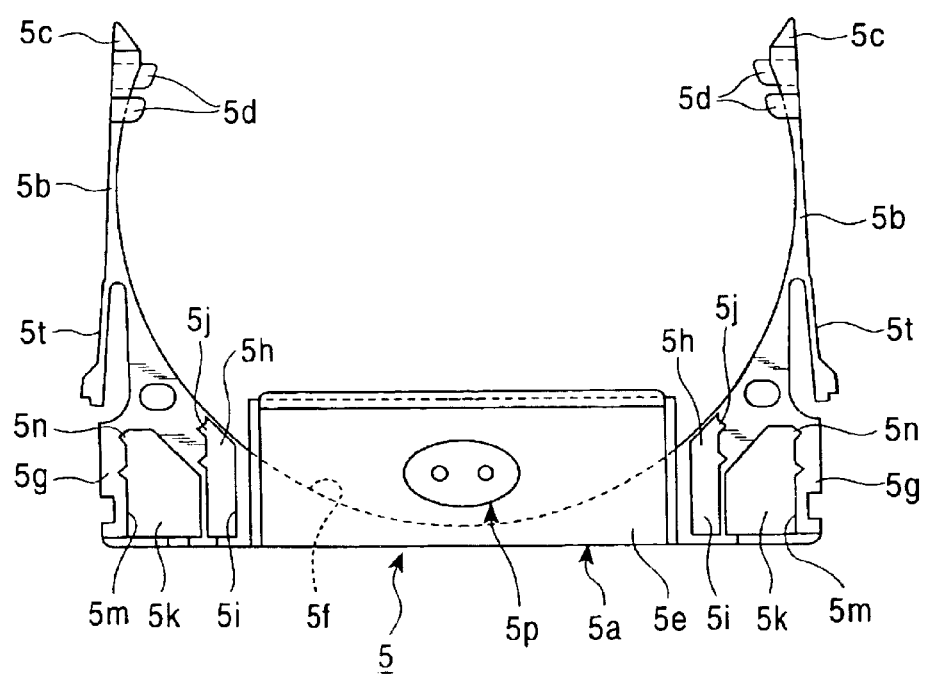
FIG. 19 is a rear elevation view of the holder.
Figure 20:
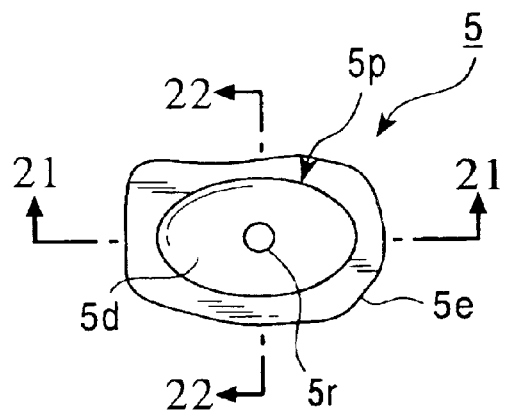
FIG. 20 is a partial view showing a principal part of the holder.
Figure 21:
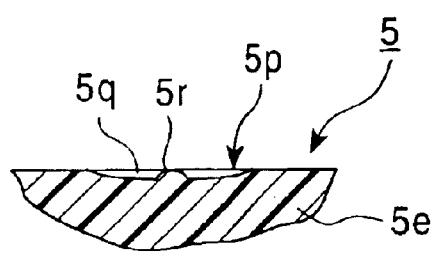
FIG. 21 is a sectional view taken along the line 21—21 in FIG. 20.
Figure 22:
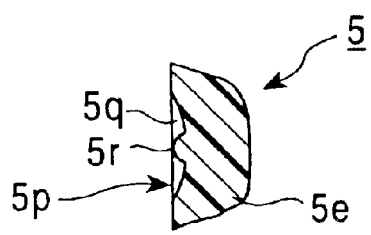
FIG. 22 is a sectional view taken along the line 22—22 in FIG. 20.
Figure 23:
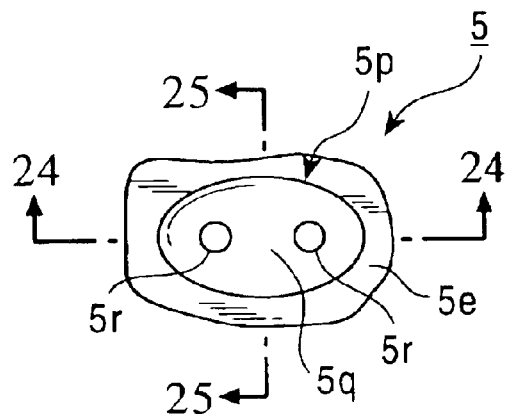
FIG. 23 is a partial view showing a principal part of the holder.
Figure 24:
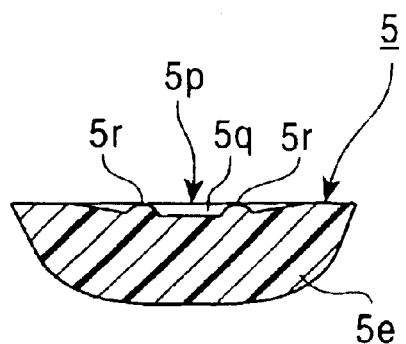
FIG. 24 is a sectional view taken along the line 24—24 in FIG. 23.
Figure 25:
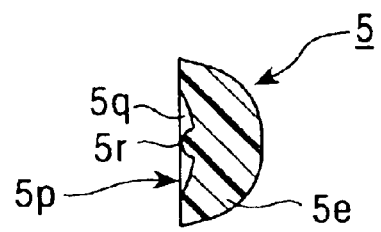
FIG. 25 is a sectional view taken along the line 25—25 in FIG. 23.

The holder 5 includes incorrect-insertion-preventing sections B provided on the extended parts 5g. The incorrect-insertion-preventing sections B have recesses 5s of different shapes provided in the left and right extended parts 5g, as shown in FIG. 17. The incorrect-insertion-preventing sections B of the holder 5 coincide with the incorrect-insertion-preventing sections A formed on the casing 1. If the holder 5 is turned upside down and an attempt is made to insert it into the casing 1, the incorrect-insertion-preventing sections A and B prevent the holder 5 from being inserted into the casing 1.

The holder 5 includes a pair of locking parts 5t, each having spring properties, provided on both sides thereof.

When the holder 5 is inserted into the accommodating section 1a of the casing 1, the latching parts 5t are inserted into the casing 1 in a state of elastically contacting the side walls 2b and 3b of the top and bottom covers 2 and 3. When the latching parts 5t coincide with the latching recesses 2y and 3y, the latching parts 5t spread out due to the spring properties thereof to be latched in the latching recesses 2y and 3y, whereby the holder 5 is mounted in the casing 1.

In removing the holder 5 from the casing 1, the latching parts 5t are first pressed toward the inside of the casing 1 from the outside of the casing 1 to unlatch the latching parts 5t from the latching recesses 2y and 3y, and then the base part 5a of the holder is pulled out.

Figure 26:
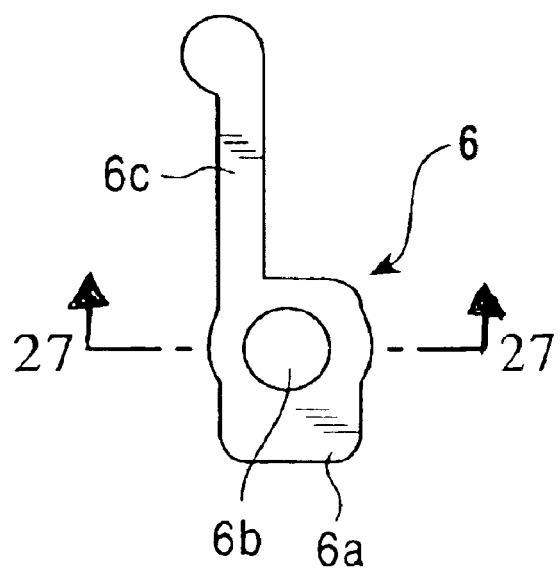
FIG. 26 is a plan view of the operation part of the optical disk cartridge.
Figure 27:
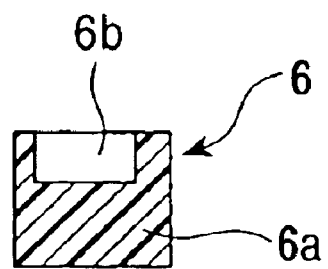
FIG. 27 is a sectional view taken along the line 27—27 in FIG. 26.

An operation is a molded article made of synthetic resin, includes a rectangular sealing part 6a, a recess 6b formed in the sealing part 6a, and an engaging part 6c having spring properties which extends from one end of the sealing part 6a, as shown in FIGS. 26 and 27.

The operation part 6 is accommodated by the holder 5 in the accommodating section 1a of the casing 1 in a state of being received in the first receiving part 5h so that the recess 6b opposes the operating slot 2i of the top cover 2, as shown in FIGS. 5 to 9.

When the operation part 6 is accommodated, the upper and lower surfaces of the operation part 6 are clamped by the top and bottom covers 2 and 3, side surfaces abut against the first guide 5i, and the engaging part 6c is engaged with the recess 5j.

That is, the operation part 6 is slidably mounted without entering into the operating slot 2i of the top cover 2 and the discrimination hole 3n of the bottom cover 3.

Figure 6:
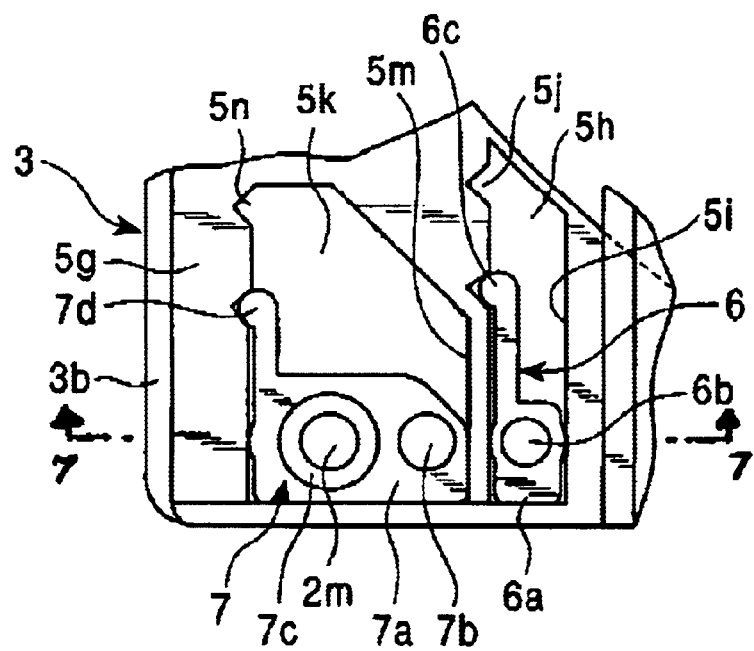
FIG. 6 is an enlarged view of a portion identified by Z in FIG. 5.
Figure 7:
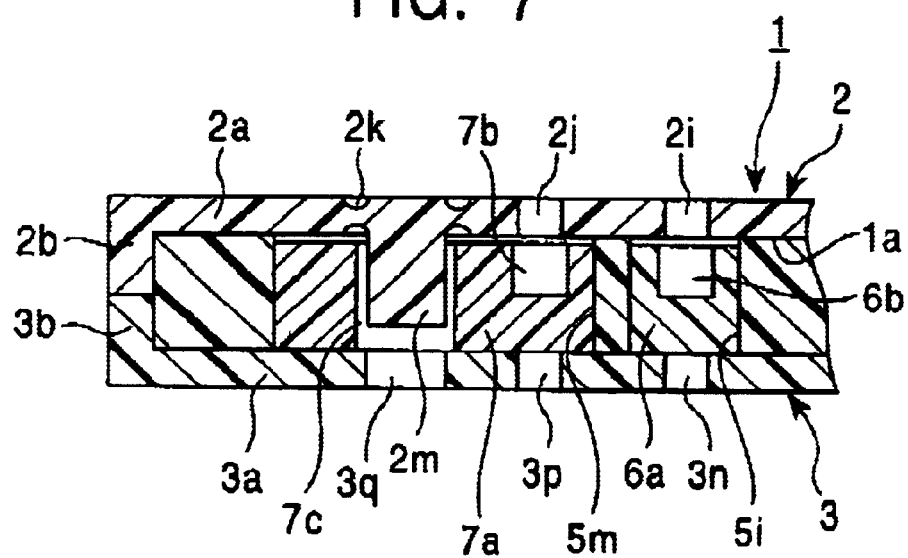
FIG. 7 is a sectional view taken along the line 7—7 in FIG. 6.
Figure 8:
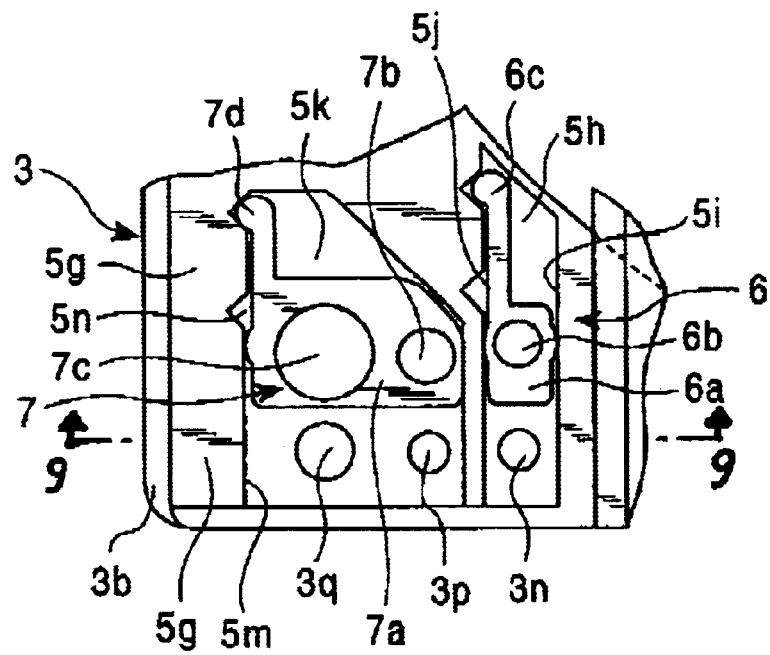
FIG. 8 illustrates movement of an operation part and an operation element of the optical disc cartridge.
Figure 9:
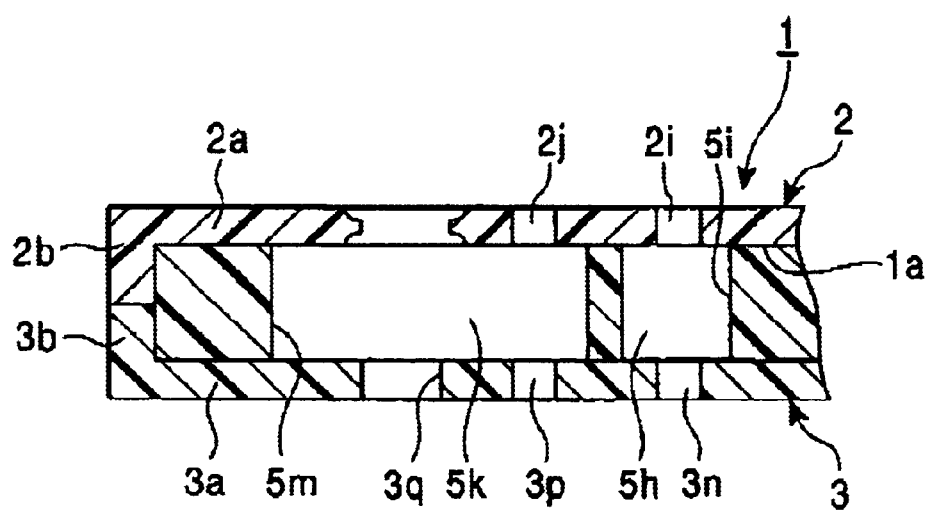
FIG. 9 is a sectional view taken along the line 9—9 in FIG. 8.

As shown in FIGS. 6 and 7, when the operation part 6 is at a position near the front of the casing 1, the discrimination hole 3n is closed by the sealing part 6a of the operation part 6 to prevent a detection pin (not shown), provided on the disk driving apparatus, from entering the discrimination hole 3n, whereby the information can be written on the disk D. When an operating tool (not shown) is passed through the operating hole 2i to be engaged with the recess 6b of the operation part 6, and the operation part 6 is slid along the operating slot 2i in the direction to separate from the front of the casing 1, the operation part 6 slides using the first guide part 5i as a guide and the engaging part 6c engages with another recess 5j, whereby the operation part 6 is positioned, as shown in FIGS. 8 and 9.

In this case, the sealing part 6a of the operation part 6 opens the discrimination hole 3n and enables the entry of the detection pin so as to protect the disk D from having information written thereon.

In this way, the sliding movement of the operation part 6 determines whether or not information can be written on the disk D.

The operation part 6 disposed on the left side of the casing 1 shown in FIG. 5 may be disposed on the right side of the casing 1. When the operation part 6 is disposed on the right side, as will be understood from FIGS. 1 and 2, the discrimination hole 2n is provided in the top cover 2 and the operating slot 3i is provided in the bottom cover 3. Therefore, the operation part 6 is disposed in a reversed state.

In this case, the disk D is used with the casing 1 turned upside down, as shown in FIG. 2, and whether or not information can be written on the disk D can be arbitrarily determined by selecting the top or the bottom side of the casing 1.

Figure 28:
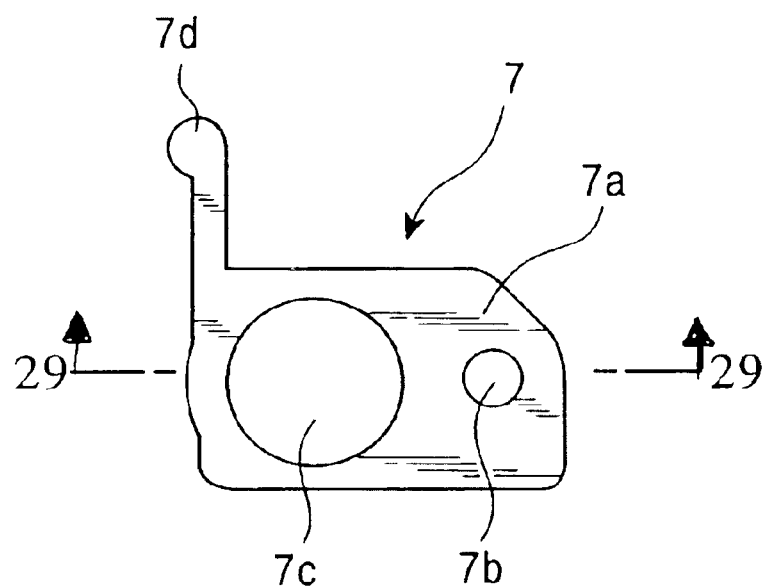
FIG. 28 is a plan view of the operation element of the optical disk cartridge.
Figure 29:
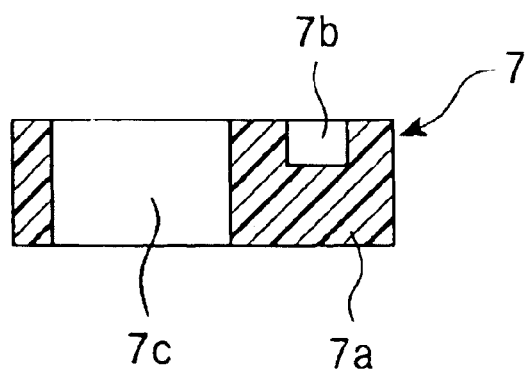
FIG. 29 is a sectional view taken along the line 29—29 in FIG. 28.
Figure 30:
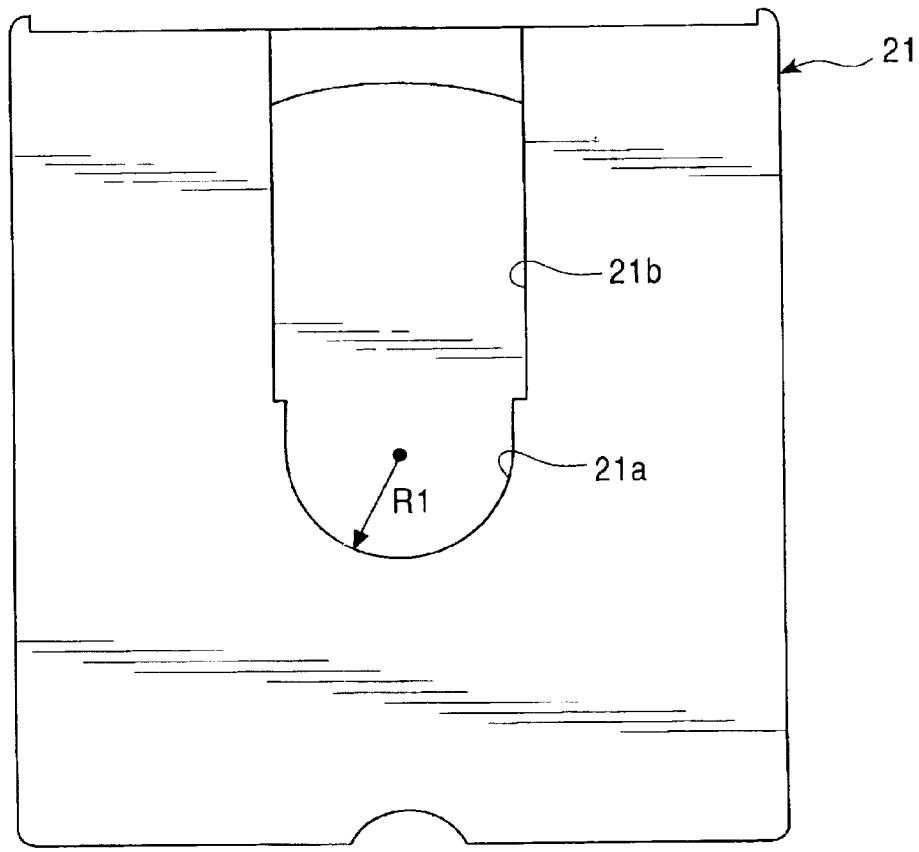
FIG. 30 is a plan view of a conventional optical disk cartridge.
Figure 31:
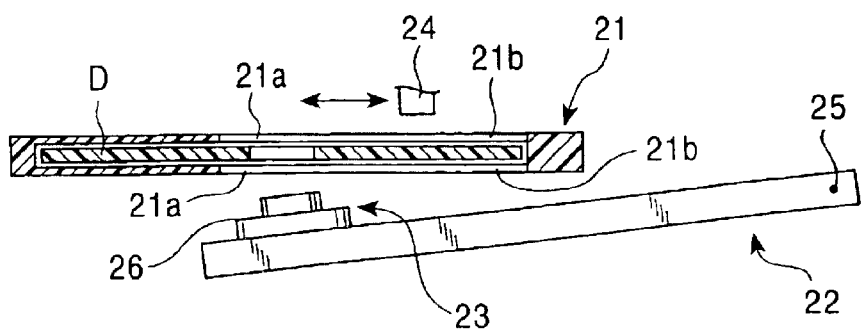
FIG. 31 illustrates the relationship between the conventional optical disk cartridge and a disk driving apparatus.

An operation element 7, which is a molded article made of synthetic resin, includes a rectangular sealing part 7a, a recess 7b formed in the sealing part 7a, a through hole 7c formed in the sealing part 7a in parallel with the through hole 7b, and an engaging part 7d having spring properties which extends from one end of the sealing part 7a, as shown in FIGS. 28 and 29.

As shown in FIGS. 5 to 9, the operation element 7 is received in the receiving part 5k and is accommodated in the accommodating section 1a of the casing 1 in a state where the recess 7b opposes the operating slot 2j of the top cover 2, the blocking part 2m of the top cover 2 is inserted into the through hole 7c, and the through hole 7c opposes the hole 3q of the bottom cover 3.

When the operation element 7 is accommodated, the movement of the operation element 7 is blocked by the blocking part 2m, the holder 5 cannot be removed from the casing 1, the upper and lower surfaces of the operation element 7 are clamped by the top and bottom covers 2 and 3, side surfaces abut against the second guide part 5m, and the engaging part 7d is engaged with the recess 5n.

That is, the operation element 7 is mounted without entering into the operating slot 2j of the top cover 2 and the discrimination holes 3p and 3q of the bottom cover 3.

When the disk D is accommodated in the casing 1 and the movement of the operation element 7 is blocked by the blocking part 2m as described above, the checking for defective regions of the disk D has been completed.

As shown in FIGS. 6 and 7, when the operation element 7 is at a position near the front of the casing 1, the discrimination hole 3p is closed by the sealing part 7a of the operation element 7 to prevent the detection pin (not shown), provided on the disk driving apparatus, from entering the discrimination hole 3p so that the completion of the checking for defective regions of the disk D is detected.

The user, however, may desire to replace the disk D in the casing 1 with another disk D from necessity.

In this case, the blocking part 2m is first broken by the operation tool (not shown) from behind the hole 3p or the blocking part 2m so as to allow the holder 5 and the operation element 7 to be removed from the casing 1.

When the holder 5 is removed from the casing 1, the operation element 7 is pulled out by the second receiving parts 5k and the disk D is pulled out by the elastic arms 5b. After the replacement of the disk D with another disk D, the second disk D and the operation element 7 are accommodated again in the accommodating section 1a of the casing 1 together with the holder 5.

The accommodated second disk D is not subjected to checking for defective regions. Therefore, when the operation tool (not shown) is passed through the operating slot 2j to be engaged with the recess 7b of the operation element 7, and the operation element 7 is slid along the operating slot 2j in a direction to separate from the front of the casing 1, the operation element 7 slides using the second guide part 5m, and the engaging part 7d engages with another recess 5n, whereby the operation element 7 is positioned, as shown in FIGS. 8 and 9.

In this case, the sealing part 7a of the operation element 7 opens the discrimination hole 3p and enables the entry of the detection pin so as to determine that defective regions of the disk D have not yet been detected.

When a defective region of the disk D is detected by the disk driving apparatus in the state shown in FIG. 8, the casing 1 is removed from the disk driving apparatus, and the operation element 7 is slid by the operation tool so as to bring about the state shown in FIG. 6.

Thereafter, it is determined that the checking for defective regions of the disk D has been completed.

The operation element 7 disposed on the left side of the casing 1 shown in FIG. 5 may be disposed on the right side of the casing 1. When the operation element 7 is disposed on the right side, as will be understood from FIGS. 1 and 2, the discrimination hole 2*p* is provided in the top cover 2 and the operating slot 3*j* is provided in the bottom cover 3. Therefore, the operation element 7 is disposed in a reversed state.

In this case, the disk D is used with the casing 1 turned upside down, as shown in FIG. 2. Therefore, the blocking part 3*m* is broken so as to enable the movement of the operation element 7 and to determine whether or not the checking for defective regions has been completed.

The blocking parts 2*m* and 3*m* may be provided separately from the top and bottom covers 2 and 3.

In this case, holes 2*q* and 3*q* may be provided at the positions of the blocking parts 2*m* and 3*m*, and separate blocking parts 2*m* and 3*m* may be inserted into the holes 2*p* and 3*q*. Assembling of such a disk cartridge is completed by combining the top and bottom covers 2 and 3 to form the casing 1, by accommodating the disk D, the operation part 6, and the operation element 7 in the casing 1, and then by mounting the separate blocking parts 2*m* and 3*m*. This facilitates manufacture of the optical disk cartridge.

As described above, the optical disk cartridge can be accurately assembled by the incorrect-insertion-preventing sections A of the casing 1 and the incorrect-insertion-preventing sections B of the holder 5 at the time of replacement of the disk D, and the top and bottom faces of the holder 5 or the optical disk cartridge can be securely identified by the identification mark 5*p* when assembling the holder 5 or when using the optical disk cartridge.

Figure 10:
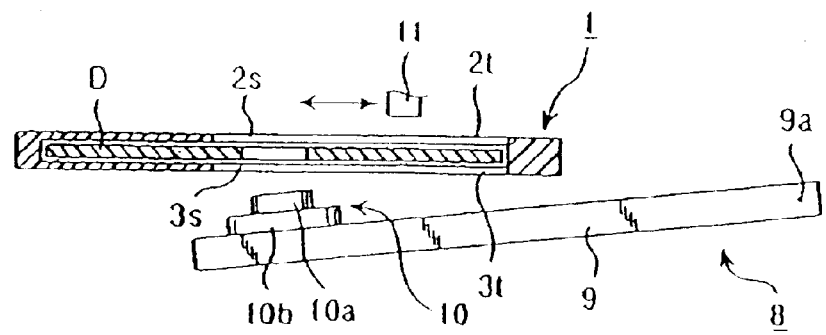
FIG. 10 illustrates the relationship between the optical disk cartridge and a disk driving apparatus according to the present invention.

When the optical disk cartridge constructed as described above is loaded on a disk driving apparatus 8, the shutter 4 is moved to open the clamping windows 2*s* and 3*s* and the reading and writing windows 2*t* and 3*t*, as shown in FIG. 10.

When the disk D is loaded, the detection pins (not shown) enter into the discrimination holes 3*n* and 3*p*, respectively, to determine whether or not information can be written on the disk D and whether or not the checking for defective regions has been completed. In addition, a table 9 is rotated about a fulcrum 9*a* to allow a spindle 10*a* of a motor 10 attached on the table 9 to be inserted into a hole of the disk D and to allow a hub 10*b* to abut against the face of the disk D, whereby the disk D is clamped.

An optical head 11 is moved in the vertical direction E (shown in FIG. 11) with the disk D rotated by the motor 10 so as to write information on the disk D or read information from the disk D.

The outer diameter of the hub 10*b* generally ranges from 25 to 29 mm. In consideration of the movement of the shutter 4 without extruding from the casing 1, the width H of the clamping windows 2*s* and 3*s* in the horizontal direction F is ±2 mm of 27.4 mm. Moreover, since the hub 10*b* moves in a circle about the fulcrum 9*a* of the table 9, the diameter G of the clamping windows 2*s* and 3*s* in the vertical direction E is ±2 mm of 28 mm.

By enlarging the size of the clamping windows 2*s* and 3*s* in the vertical direction E, the hub 10*b* can be prevented from colliding with the casing 1 during the circular motion thereof. In addition, by reducing the size of the clamping windows 2*s* and 3*s* in the horizontal direction F, the amount of movement of the shutter 4 can be secured.

The optical disk cartridge of the present invention includes the casing 1 having a pair of walls 2*a* and 3*a* for accommodating the disk D therein. The walls 2*a* and 3*a* of the casing 1 are formed with clamping windows 2*s* and 3*s* for clamping the disk D at the central portions thereof, and are formed with reading and writing windows 2*t* and 3*t* for reading information from the disk D and writing information on the disk D from the clamping windows 2*s* and 3*s* to the side edges of the casing 1, the shutter 4 capable of opening and closing the clamping windows 2*s* and 3*s* and the reading and writing windows 2*t* and 3*t* is slidably provided, and the horizontal size H of the clamping windows 2*s* and 3*s* along a sliding direction of the shutter 4 is formed shorter than the vertical size G thereof orthogonal to the sliding direction of the shutter 4. Therefore, the size of the clamping windows 2*s* and 3*s* can be reduced so as to prevent the clamper and the hub 10*b* from colliding with the walls 2*a* and 3*a* due to the circular motion thereof, and the size of the optical disk cartridge can be reduced so that the shutter 4 is not extruded from the casing 1.

The clamping windows 2*s* and 3*s* are formed by linear parts K opposing along the sliding direction of the shutter 4, and arcuate parts J connecting the linear parts K, and the distance H between the linear parts K is shorter than the diameter G of the arcuate parts J. Therefore, the shape of the optical disk cartridge can be simplified, and the linear parts K are shaped along the reading and writing windows 2*t* and 3*t* and the side edges of the shutter 4. In addition, the clamping windows 2*s* and 3*s* can be opened and closed as the shutter 4 opens and closes the reading and writing windows 2*t* and 3*t*.

The diameter of the arcuate parts J of the clamping windows 2*s* and 3*s* is ±2 mm of 28 mm, and the distance between the linear parts K is be ±2 mm of 27.4 mm. Therefore, the amount of movement of the shutter can be secured such that it is not extruded from the casing 1, and the size of the optical disk cartridge can be reduced such that the hub 10*b* can be inserted. In particular, the optical disk cartridge is suitable for use with 80 mm disks.

The projections 2*u* and 3*u* for narrowing the width of the reading and writing windows 2*t* and 3*t* are formed on the border of the clamping windows 2*s* and 3*s* and the reading and clamping windows 2*t* and 3*t*. Therefore, when the shutter 4 repeatedly opens and closes the clamping windows 2*s* and 3*s* and the reading and writing windows 2*t* and 3*t*, the engagement between the shutter 4 and the side edges of the clamping windows 2*s* and 3*s* and the reading and writing windows 2*t* and 3*t* can be reduced, and the shutter 4 can be smoothly moved.

What is claimed is:

1. An optical disk cartridge comprising a casing having a pair of walls for accommodating an optical disk therein;
    wherein said walls of the casing each comprise a clamping window for clamping said disk at the central portion thereof, and a reading and writing window for reading information from said disk and writing information on to said disk, said reading and writing window extending from a perimeter of said clamping window to a side edge of said casing;
    wherein a shutter capable of opening and closing each of said clamping windows and each of said reading and writing windows is slidably provided on said casing;
    wherein the perimeter of said clamping window comprises a pair of opposing linear portions connected between a pair of opposing arcuate portions, said linear portions each extending orthogonally to a sliding direction of the shutter and intersecting with a line that extends parallel to the sliding direction of said shutter and passes through a rotational axis of the optical disc, said arcuate portions comprising arc segments of a single circle having a radii that intersects the rotational axis of said optical disc; and wherein a lateral width of each of said clamping windows as measured between the pair of opposing linear portions and along the line intersecting the rotational axis of said optical disk and parallel to the sliding direction of said shutter is formed shorter than a longitudinal length of said clamping windows as measured between the pair of opposing arcuate portions and along the radii intersecting said rotational axis of said optical disk.

2. The optical disk cartridge according to claim 1, wherein the width between the opposing pair of linear portions of each of said clamping windows, as measured along the line intersecting the rotational axis of said optical disk and parallel to the sliding direction of said shutter, is ±2 mm of 27.4 mm.

3. The optical disk cartridge according to claim 1, wherein projections for narrowing the width of said reading and writing windows are formed on the border of said clamping windows and said reading and clamping windows.

4. The optical disk cartridge according to claim 1, wherein the longitudinal length between the opposing pair of arcuate portions of each of said clamping windows, as measured along the radii intersecting the rotational axis of said optical disk and orthogonal to the sliding direction of said shutter, is ±2 mm of 28 mm.

* * * * *